United States Patent [19]

Ellis

[11] 4,255,014
[45] Mar. 10, 1981

[54] EDGE ENHANCEMENT OF PHASE PHENOMENA

[75] Inventor: Gordon W. Ellis, Media, Pa.

[73] Assignee: Research Corporation, New York, N.Y.

[21] Appl. No.: 817,486

[22] Filed: Jul. 20, 1977

[51] Int. Cl.$^3$ ............................................. G02B 21/14
[52] U.S. Cl. ...................................... 350/13; 350/15; 350/17
[58] Field of Search ...................... 350/12, 13, 14, 15, 350/17, 154

[56] References Cited

U.S. PATENT DOCUMENTS

| | | | |
|---|---|---|---|
| 2,427,689 | 9/1947 | Osterberg | 350/13 |
| 2,516,905 | 8/1950 | Osterberg et al. | 350/13 |
| 2,924,142 | 2/1960 | Nomarski | 350/13 |
| 3,004,466 | 2/1961 | Wiedemann | 350/13 |
| 3,506,333 | 4/1970 | Land | 350/154 |
| 3,628,848 | 12/1971 | Normarski | 350/12 |
| 4,062,619 | 12/1977 | Hoffman | 350/13 |

FOREIGN PATENT DOCUMENTS 2634832  2/1977  Fed. Rep. of Germany ............. 350/14

OTHER PUBLICATIONS

*McGraw-Hill Encyclopedia of Science and Technology*, vol. 8, 8, pp. 457–472 (3rd Edition).
W. C. Stewart, "On Differential Phase Contrast with an Extended Illumination Source," J. Opt. Soc. Am., vol. 66, No. 8, pp. 813–818 (Aug. 1976).
F. Zernike, "The Wave Theory of Microscopic Image Formation," in J. Strong, *Concepts of Classical Optics*, pp. 525–536 (Freeman, 1958).
L. A. Wren, "Understanding and Using the Phase Microscope," pp. 14–17, (Unitron Educational Pub. 1965).
L. Gross and R. Hoffman, "Modulation Contrast Microscope", *Applied Optics*, vol. 14, No. 5, pp. 11–69–76 (May 1975).
A. H. Bennett et al., *Phase Microscopy*, pp. 155–164 (Wiley, 1951).
H. Delang and N. H. Dekkers, "Microscope Adapted for the Generation of Various Contrast Types: Theory and Experiment", *Applied Optics*, vol. 16, No. 8, pp. 2215–2222 (Aug. 1977).
Encyclopedia Britannica, "The Phase Microscope", pp. 1–9 (1946).

*Primary Examiner*—Jon W. Henry
*Attorney, Agent, or Firm*—Pennie & Edmonds

[57] ABSTRACT

A method and apparatus are described for viewing of phase phenomena by forming the image of an object by using the undiffracted beam and essentially only one of the sidebands and attenuating the undiffracted beam and the sideband at a rear focal plane of an image forming lens. My invention may readily be implemented in a conventional microscope by use of a suitable aperture in the front focal plane of a condenser lens and a suitable attenuator in the rear focal plane of the objective lens. In one embodiment, the condenser aperture is essentially semi-circular. The attenuator comprises a polarizer, a polarization filter and an analyzer with the filter being located substantially in the rear focal plane. The polarization sensitive filter is divided in equal halves one of which consists of polarization sensitive material having a direction of polarization that is perpendicular to that of the other half. Preferably, the polarization sensitive filter is mounted so that the image of the undiffracted beam formed by the condenser aperture is coincident with only one of the two halves of the polarization filter.

56 Claims, 11 Drawing Figures

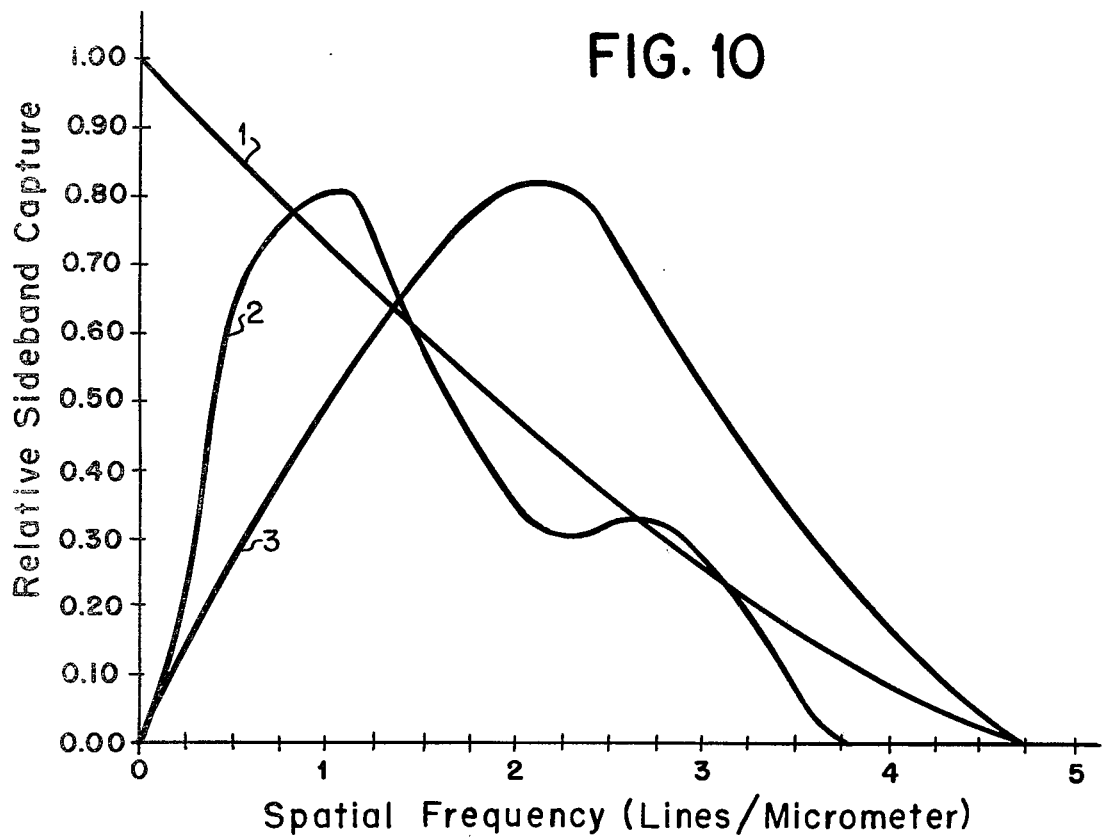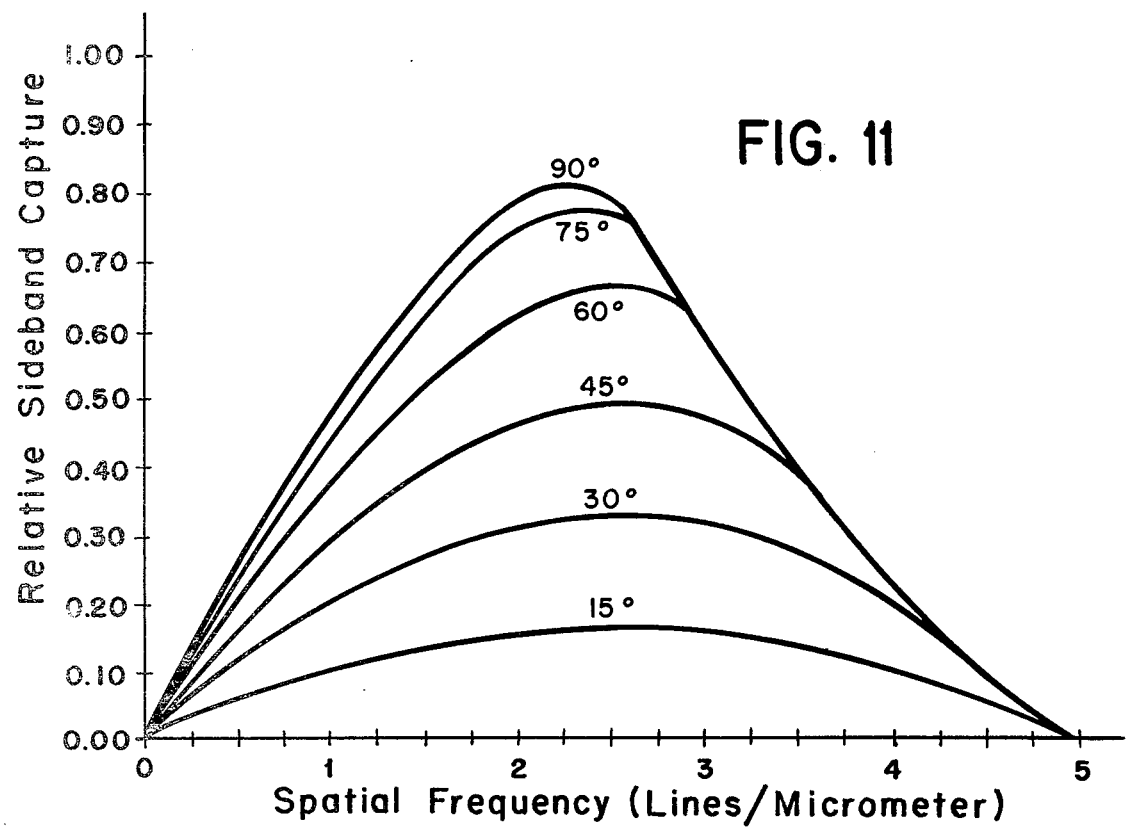

EDGE ENHANCEMENT OF PHASE PHENOMENA

RIGHTS OF THE UNITED STATES GOVERNMENT

The invention described herein was made in the course of work under a grant or award from the Department of Health, Education and Welfare and the Government has rights in this invention pursuant to Grant No. BMS 75-00473 awarded by the National Science Foundation

BACKGROUND OF THE INVENTION

This invention concerns a method and apparatus for viewing phase phenomena. It is particularly suitable for use in viewing microscopic objects and the inventon will be described in detail in that context.

A phase phenomenon is one that alters the path length, but not the intensity, of a beam of time-varying radiation incident on it or passing through it as compared to a beam passing along the same path in the absence of such phenomenon. Although the invention conceivably could be practiced using sound waves, applications using a beam of electromagentic radiation are of far greater interest and the invention will be described in such terms in viewing microscopic objects. Any perfectly transparent object is a phase object since it alters the optical path length, but not the intensity, of a beam of electromagnetic radiation. Since the human eye detects variations in light intensity but is insensitive to phase variations, a purely phase object is invisible. Similarly, since photographic film is insensitive to phase variations, it is impossible to record the image of a phase object on film. In practice many objects which theoretically are phase objects will reduce the intensity of incident light by effects such as scattering, reflection and refraction making it possible to see these objects because of the resulting alterations in the intensity of light across the object. This, for example, is often how one discerns the presence of a plate glass window.

Phase phenomena may also be produced by reflecting a beam of incident radiation from an object having a uniformly reflective but contoured surface. Here, the surface contours alter the path length of the incident beam.

Numerous techniques are well known for the study of phase phenomena. In all these techniques radiation from the phase phenomenon being studied is modified so that phase differences caused by the object are converted to intensity differences in the image.

Most of these techniques are based on diffraction effects caused by the object being studied. As is well known, when a planar grating made of equi-spaced parallel straight opaque lines is illuminated by a collimated beam of light, some of that light is diffracted from its original path by the grating. The diffracted light travels along paths at equal angles to the right and left of the illuminating beam path in a plane perpendicular to the lines of the grating. The undiffracted light is known as the zeroeth order. The diffracted light to its right is the right sideband and that to the left is the left sideband. The various orders of diffracted light, first and higher, are in mirrored sequence in the two sidebands, symmetrically arrayed about the undiffracted beam.

Using a point source of light to illuminate a microscopic object, Ernst Abbe demonstrated that the light diffracted by the object carries the information specifying the shape of the object. The function of the microscope objective lens is to gather the diffracted light and the undiffracted part of the illuminating beam and redirect their paths so that they combine, without relative alteration in their optical path lengths, at the image plane. Here, interference between the undiffracted part of the illuminating beam and the diffracted light forms the image. Unless at least some of the light diffracted by the object is gathered by the objective, the object will not be resolved. He also observed, as exemplified in the case of extreme oblique illumination, that either sideband of the diffracted light can be combined with the undiffracted light to form the image even in the complete absence of the other sideband. Consideration of these facts led him to an understanding of the role of the numerical apertures of both the objective lens and the condenser lens in determining the resolving power of a microscope.

Subsequently, many noticed that phase objects were invisible under the conditions Abbe prescribed for maximum resolution. Zernicke examined this problem and found that the light diffracted by light absorbing objects had at the image plane a net phase displacement of 180 degrees relative to the undiffracted light. This produces destructive interference, thus accounting for the local intensity differences which make up the visible image. Zerincke reasoned that transparent objects, which do not produce visible intensity modulated images because they do not absorb light, must nevertheless produce images that recreate the phase displacements experienced by the light waves in passing through these objects. This could only occur if the light diffracted by these objects had at the image plane a net phase displacement of only 90 degrees. This conclusion led him to the development of the phase contrast microscope in which a phase plate located at the back focal plane of the objective produces an additional 90 degree phase shift between the diffracted light and the undiffracted part of the illuminating beam. This additional phase shift results in destructive interference and, therefore, a visible intensity modulated image.

Such a phase modification of the diffracted light can be accomplished in the rear focal plane of the objective lens of a microscope because the undiffracted beam is localized as an "image" of the light distribution in the front focal plane of the condenser lens. Thus, if the object is illuminated by directing a beam which propagates along the optical axis of the microscope through a circular aperture located in the front focal plane of a condenser lens, at the rear focal plane this beam will be localized as a spot of light at the center of the focal point, while the light diffracted by the object will be found throughout the focal point. The phase of the undiffracted beam can be modified relative to that of the diffracted light by inserting at the rear focal plane a phase plate which has a small central zone that is thicker or thinner than the surrounding region thereby increasing or decreasing the optical path length of the undiffracted light by the desired fraction of a wavelength. Similarly, if the object is illuminated by directing the illuminating beam through an annular aperture at the front focal plane of the condenser lens, as is presently preferred, the undiffracted beam may be modified at the rear focal plane by a phase plate having an annular zone of different optical path length. And, in general, to modify the phase of the undiffracted beam, the zone of different optical path length at the rear focal plane of the objective lens should match or image the aperture at the front focal plane of the condenser lens. Those skilled in the art will recognize the front focal plane of the condenser lens and the rear focal plane of the objective lens as Fourier transform planes. For further details on phase microscopy, see *McGraw-Hill Encyclopedia of Science and Technology*, Vol. 8, pp. 469-472 (3d edition), as well as Zernicke's chapter "The Wave Theory of Microscopic Image Formation" in J. Strong, *Concepts of Classical Optics* (Freeman, 1958).

Numerous modifications have been made to the basic phase contrast techniques. Although rectangular slit and cross shaped illuminating apertures and matching phase plates were initially used, contemporary commercial phase contrast microscopes use annular illuminating apertures and phase plates. Zernicke and others have suggested the use of attenuators in conjunction with the phase plates in the rear focal plane to modify the amplitude ratio between the diffracted beam and the undiffracted beam. See, for example, p. 533 of Zernicke's chapter cited above. Moreover, if the attenuator reduces the intensity of the undiffracted beam to nearly zero, dark field conditions will be achieved. However, since such attenuators are designed to produce only one amplitude ratio, they are inconvenient to use in situations where it is desirable to vary that ratio.

To alleviate this problem, others have used polarizers as variable attenuators in a structure in which a polarizer is placed before the condenser lens, an analyzer is located before the eyepiece and a polarizing filter is positioned in the rear focal plane of the objective. The filter comprises an annulus polarized in one direction with the center portion and periphery of the annulus polarized at right angles thereto. See, for example, A. H. Bennett, et al, *Phase Microscopy*, pp. 155-164 (Wiley 1951). The efficacy of such devices, however, is hampered by depolarization which takes place at the surface of each lens.

While phase contrast microscopes based on Zernicke's design still predominate as the most frequently used method for viewing microscopic phase objects, some of the peculiarities of the phase contrast images produced have prompted the development of other methods. Most frequently cited as objectionable is the halo of reversed contrast that borders image edges. Image duplicating interference microscopes have been developed to avoid this problem as well as to allow the quantitation of object optical thickness.

For example, in the interference microscope, interference is produced between two beams, one of which has been modified by a phase object. In the Linnik microscope for reflecting specimens, the Dyson microscope and the Smith-Baker microscope, one of these beams is a reference beam which does not illuminate the object while the other does. The two beams are combined by a semireflecting surface to cause interference which reveals surface contours in the case of reflecting specimens and differences in the optical path length through different portions of transparent specimens. Alternatively, both beams may illuminate the object at closely spaced but separate regions, in which case their interference reveals the rate of change of optical path length through different portions of transparent specimens as in the Nomarski microscope. The Linnik, Dyson and Smith-Baker microscopes are described in *McGraw-Hill Encyclopedia of Science and Technology*, Vol. 8, pp. 458-459 (3d edition). The Normarski microscope is described there and also in U.S. Pat. No. 2,924,142.

Because the angle at which the diffracted light diverges from the path of the illuminating beam increases directly as an arcsin function of the product of the wavelength of the illumination bean and the spatial frequency of the object detail responsible for diffraction, the portion of the diffracted light that can be gathered by an objective of given numerical aperture decreases as the spatial frequency of the object detail increases. Thus, the normal microscope objective with a full circular aperture and illuminated by a condenser of matching aperture acts as a spatial frequency filter favoring the low frequencies of the object structure, even though this combination extends the absolute limit of resolution (Abbe's limit) to the highest spatial frequencies possible for that objective. Consequently, while the image duplicating type of interference microscope eliminates the halo of the phase contrast microscope and has the desirable ability to quantitate optical path differences in the object, it does so at the expense of reduced visibility of the resolvable fine structure of the object. The differential interference contrast microscopes of Nomarski and Leitz-Smith preserve the use of the full objective and condenser aperture and produce high contrast for relatively fine specimen detail because its contrast generating mechanism constitutes a high pass spatial frequency filter. This is achieved at the cost of making the image resolution dependent on object orientation. On the whole, the differential interference microscope is capable of superior performance in imaging small phase objects but it requires exceptional care in construction and uses expensive crystalline components.

The modulation contrast system described by Hoffman is still another type of microscope for viewing phase objects. In this system light is directed through a rectangular slit at the condenser entrance pupil to illuminate the object; and then this light is attenuated by a three level attenuator located in the rear focal plane of the objective lens. The attenuator is circular in shape with a center band which permits limited transmission and two D-shaped regions on either side of the center band, one of which transmits incident light and the other of which blocks nearly all incident light. See, R. Hoffman et al., "The Modulation Contrast Microscope", *Applied Optics*, Vol. 14, No. 5 p. 1169 (May 1975).

Hoffman's theory for the operation of this device is that phase gradient objects in the specimen plane act as small prisms which refract the portion of the illuminating beam passing through them so that it falls either in the more transparent zone or in the more absorbing zone of the attenuator. In the image the regions, whose zero order light was refracted into the high transmission zones will appear brighter than the background, those whose zero order light was refracted into the low transmission zone will appear darker than the background and regions with constant optical thickness will not refract the zero order and will remain the same intensity as the background. This system has the virtue of simplicity but suffers from deficiencies in performance. This device is best suited for use at low magnifications for examining objects whose dimensions are much greater than the wavelength of light and whose image formation is therefore much less dependent on diffraction phenomena. At high magnifications it suffers from the limitations imposed by the use of a slit as entrance pupil. These are a susceptibility to disturbances in the image from objects out of the plane of focus and a strong dependence of resolution on specimen orientation relative to the slit.

SUMMARY OF THE INVENTION

Diffraction of light by a phase object differs in important ways from light diffraction by an absorbing or opaque object. We have noted above the difference Zernicke found. Blazed diffraction gratings, as described, for example, at pp. 217-219 in J. Strong *Concepts of Classical Optics,* dramatically illustrate that, phase gratings, unlike absorbing gratings, do not necessarily put equal energy into both sidebands. This is also true for phase objects in general. Furthermore, the phase displacement of the two sidebands is generally not equal. Even under Zernicke's conditions, when their sum is one quarter wave out of phase with the zeroeth order, either sideband by itself may be capable of destructive or constructive interference with the zeroeth order thereby producing an intensity modulated image even though in the presence of both sidebands no intensity difference may be produced. Moreover, oblique illumination, which tends to favor one sideband over the other, can by itself produce intensity modulated images from phase objects. See, W. C. Stewart, J. Opt. Soc. Amer., Vol. 66, No. 8, p. 813 (August 1976).

I have found that the viewing of phase phenomena may be enhanced by forming the image of the object using the undiffracted bean and essentially only one of the sidebands and attenuating the undiffracted beam at a rear focal plane of the objective lens.

My invention may readily be implemented in a conventional microscope by use of a suitable aperture in the front focal plane of the condenser lens and a suitable attenuator in the rear focal plane of the objective lens. In a specific embodiment of my invention the illuminating beam is shaped so that the bundle of light rays converging on the object from the condenser lens is only a section of a cone. This is readily accomplished using a circular aperture in the front focal plane of the condenser lens together with an opaque vane which limits light transmission to the contiguous region defined by the arc of the aperture and the edge of the vane. In most applications of my invention I prefer to set the edge of the vane so as to define a condenser aperture that is approximately a semi-circle with the result that the bundle of rays is approximately a half-cone. The undiffracted "image" of a semicircular aperture is formed on one side of the optical axis at the rear focal plane of the objective lens. The attenuator is implemented by a polarizer, a polarization sensitive filter and an analyzer, of which the filter is located substantially in the rear focal plane. The polarization sensitive filter is divided in equal halves one of which consists of polarization sensitive material having a direction of polarization that is perpendicular to that of the other half. Preferably, the polarization sensitive filter is mounted so that the image of the undiffracted beam formed by the condenser aperture is coincident with only one of the two halves of the polarization filter.

In the preferred embodiment of the invention the polarizer and analyzer may be rotated relative to the polarization sensitive filter. As will be apparent to those skilled in the art, this permits variable attenuation of the portion of light directed through one of the halves of the polarization sensitive filter relative to light directed through the other half. As a result, any contrast ratio desired may be achieved between the undiffracted and diffracted beams from the illuminated object. Since attenuation in the undiffracted beam may range up to 100% it is possible to change the microscope from a bright field to a dark field microscope merely by rotation of the polarizer and analyzer with respect to the filter. In addition, to provide a 90 degree phase shift between the undiffracted beam and the sideband, a quarter wave birefringent retardation plate may be inserted between the attenuator and the analyzer. In place, it is oriented so that its two axes of birefringence are respectively parallel to the directions of polarization in each of the two halves of the attenuator.

BRIEF DESCRIPTION OF THE DRAWINGS

These and other objects, features and elements of the invention will be more readily apparent from the following detailed description in which:

FIGS. 10 and 11 are calculated curves of sideband capture vs. spatial frequency.

DETAILED DESCRIPTION OF THE DRAWING

Figure 1:
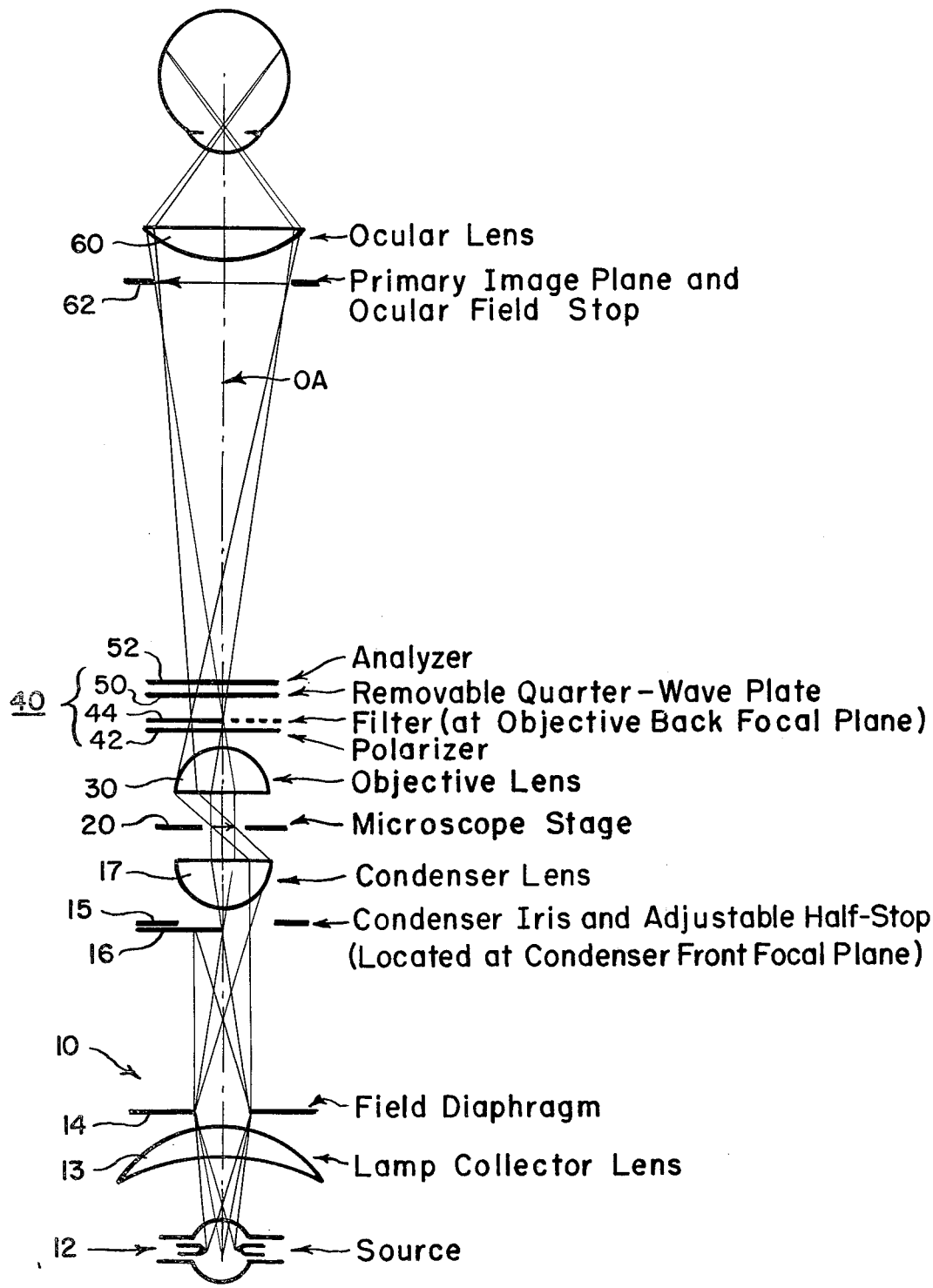
FIG. 1 is a schematic illustration of an illustrative embodiment of my invention.

The illustrative embodiment of FIG. 1 comprises an illuminator 10, a stage 20 on which an object (or specimen) is mounted, an objective lens 30, an attenuator 40 at the rear focal plane of objective lens 30, an ocular 60 and an ocular field stop 62, each of which is centered on optical axis OA and is symmetric thereabout with the exception of elements 12, 16 and 44 described below.

Illuminator 10 further comprises a source 12 of electromagnetic radiation, a lamp collector lens 13, a field diaphragm 14, a condenser iris 15, an adjustable stop 16 and a condenser lens 18. For viewing purposes, source 12 is, of course, a visible light source as that commonly used in phase microscopy. The condenser iris and adjustable stop are located at the front focal plane of condenser lens 18. As will be apparent from the ray traces shown in FIG. 1, the beam of electromagnetic radiation incident on the front focal plane of the condenser has a substantial diameter and is by no means a point source at the front focal plane such as was used by Abbe. Moreover, this beam is diverging at the front focal plane.

Figure 6:
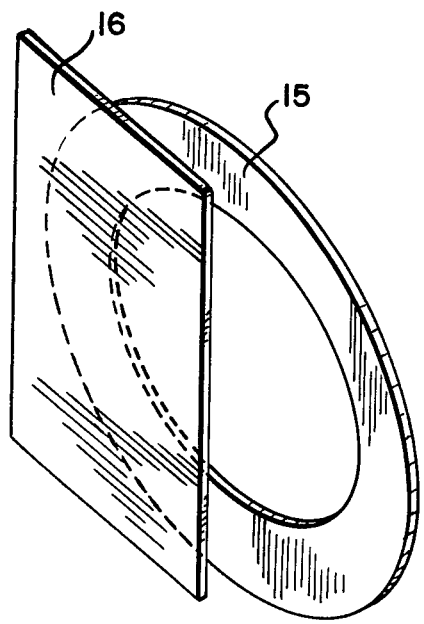
FIG. 6 is a schematic illustration of an illustrative embodiment of a filter suitable for use in the illuminating beam of my invention.

As shown in FIG. 6, iris 15 typically is a circular aperture. Preferably, it is a conventional microscope iris which may be adjusted to vary the diameter of its aperture. Stop 16 blocks all radiation on one side of the iris aperture as shown in FIG. 1. Advantageously it is designed to be adjustable in a direction perpendicular to the optical axis so that the amount of light that is passed can be varied. As will be apparent such adjustments will also vary the coherence and the spatial frequency distribution in the light that illuminates the object. Preferably, edge 17 of stop 16 is straight so that the aperture is defined by the arc of a circle and a chord. In the embodiment shown in FIG. 1, stop 16 is positioned so that the aperture is approximately a semi-circle.

Microscope stage 20 preferably is rotatable about axis OA but conceivably could be fixed in place.

Figure 7:
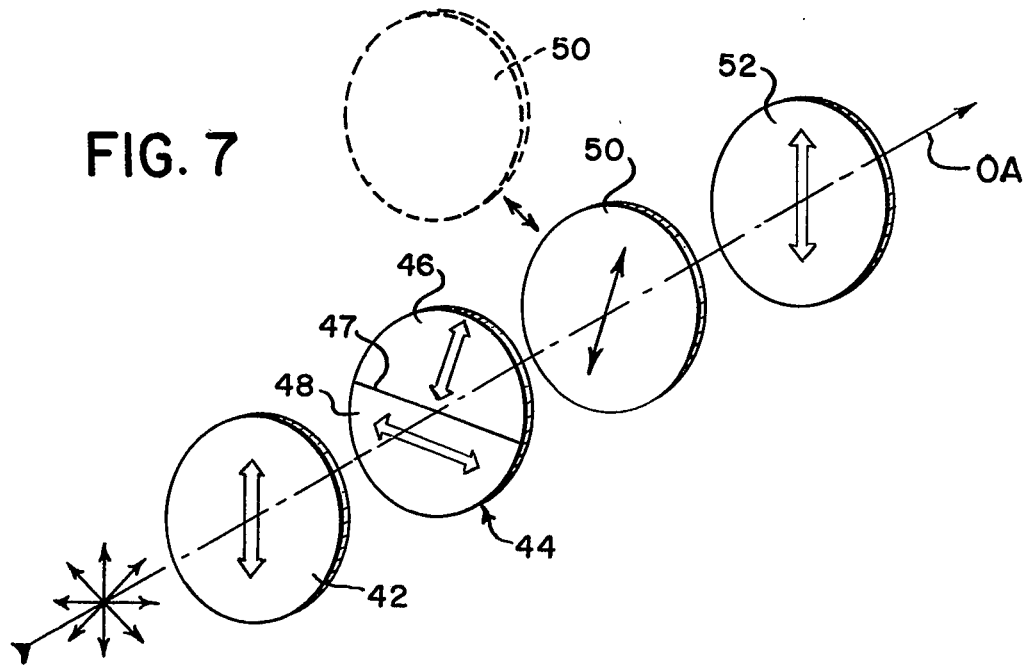
FIG. 7 is a schematic illustration of an illustrative embodiment of a preferred attenuator of my invention.

As shown more clearly in FIG. 7, attenuator 40 comprises a linear polarizer 42, a polarization sensitive filter 44, an optional quarterwave retardation plate 50 and an analyzer 52. Polarizer 42 and analyzer 52 are linear polarizers. Preferably, the polarizer and analyzer may be rotated about the optical axis OA. Polarization sensitive filter 44 comprises two linearly polarizing regions 46, 48 in which the direction of polarization is different. Preferably, the directions of polarization in the two regions are at right angles to one another as shown in FIG. 7. In the embodiment shown in FIG. 1, filter 44 positioned so that the border 47 between the two polarization sensitive regions intersects optical axis OA.

Quarter-wave retardation plate 50 may be mounted between filter 44 and analyzer 52 so that its fast axis is parallel to the direction of polarization of one of the two regions of filter 44 while its slow axis is parallel to the direction of polarization of the other region. As a result, the phase of the light that is transmitted through one of the two regions will be altered by a quarter-wave with respect to the phase of light that is transmitted through the other region. Since such a phase change may not be necessary in all applications of the invention, the quarter-wave plate is preferably made so it can be readily removed from the apparatus shown in FIG. 1. Optionally, wave plates or birefringence compensators producing other phase changes between the beams transmitted through the two regions of filter 44 may also be inserted between the filter and the analyzer.

From the ray traces of FIG. 1 and the foregoing discussion it will be apparent that an object mounted on stage 20 will be illuminated by light which is propagating parallel to the optical axis and is therefore along the normal to stage 20 as well as by light that is propagating obliquely (i.e., at an angle) to the optical axis. In general, the light incident on the object will be a half-cone of rays with the object positioned toward the narrower portion of the cone.

As is well known from Fourier transform theory, in the rear focal plane of objective lens 30 there will be formed a series of "images" of the light from the front focal plane of condenser lens 18. These "images" are images of the condenser aperture formed by the undiffracted illuminating beam as well as the various orders diffracted by the specimen. In the device shown in FIG. 1, an undiffracted image is formed on the left hand side of the rear focal plane of objective lens 30 and diffracted light from only one sideband is incident on the right hand side. The direction of the illuminating beam and the location of lenses and apertures prevents the diffracted light from the other sideband from reaching the right hand side of the rear focal plane. Polarization sensitive filter 44 is positioned so that it coincides with the rear focal plane, or Fourier transform plane, of objective lens 30. In addition, it is oriented so that the undiffracted image falls on only one region 46 or 48 of polarization. Under these circumstances, consideration of the operation of polarizer 42 and analyzer 52 in conjunction with filter 44 will reveal that rotation of the polarizer and analyzer with respect to filter can vary the attenuation of the undiffracted image from zero to nearly 100% relative to the attenuation experienced by the diffracted light which is incident on the other region of this filter. Thus, by rotating the polarizer and analyzer through 90° one can go continuously from the extremes of dark field illumination to the extremes of bright field illumination.

At the same time any amount of phase change between the diffracted and undiffracted images can be introduced by inserting the appropriate phase retardation plate 50 between filter 44 and analyzer 52. In conventional or double sideband phase microscopy, a quarter-wave plate is ordinarily needed to obtain any image. In single-sideband microscopy an externally produced phase shift is not needed to obtain an image but can enhance the contrast of particular object details. Such phase changes may be usefully introduced by variable birefringence compensators.

Figure 2:
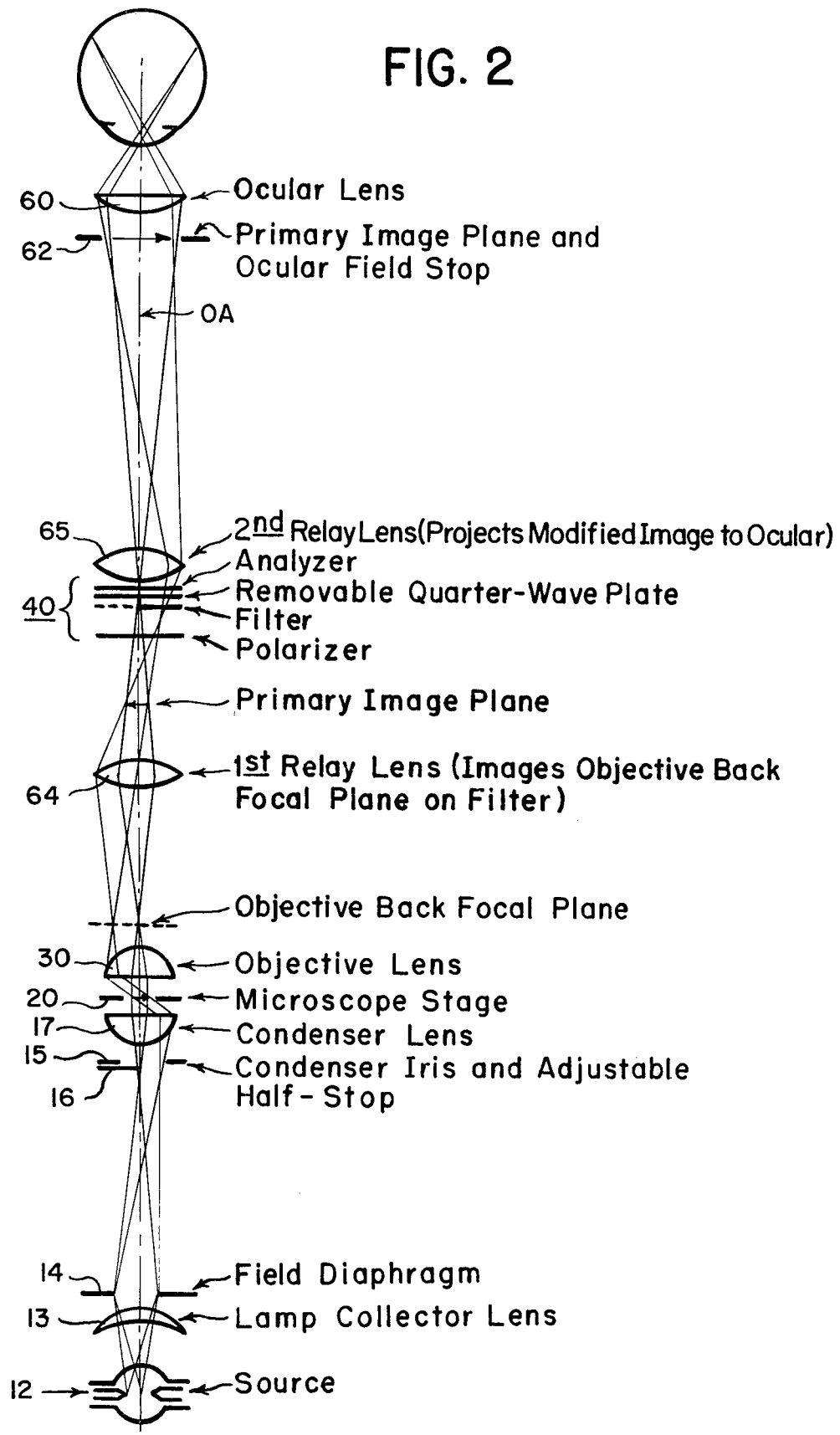
FIGS. 2-5 are schematic illustrations of alternative embodiments of my invention.

Because it is frequently difficult to insert anything in the focal plane that immediately follows objective lens 30, I prefer to practice my invention by placing attenuator 40 at an image of this focal plane. A particular apparatus illustrating such a structure is shown in FIG. 2. The apparatus is identical to that of FIG. 1 except for the presence of first and second relay lenses 64, 65. Relay lens 64 images the back focal plane of objective lens 30 onto filter 44. Relay lens 65 projects the image modified by filter 44 to ocular 60. The use of such relay lenses in optics is well known and need not be discussed further. However, the use of such lenses offers two important advantages: first, filter 44 will serve for any objective lens used with the microscope and, second, attenuator 40 may easily be retrofitted to many existing microscopes.

Figure 3:
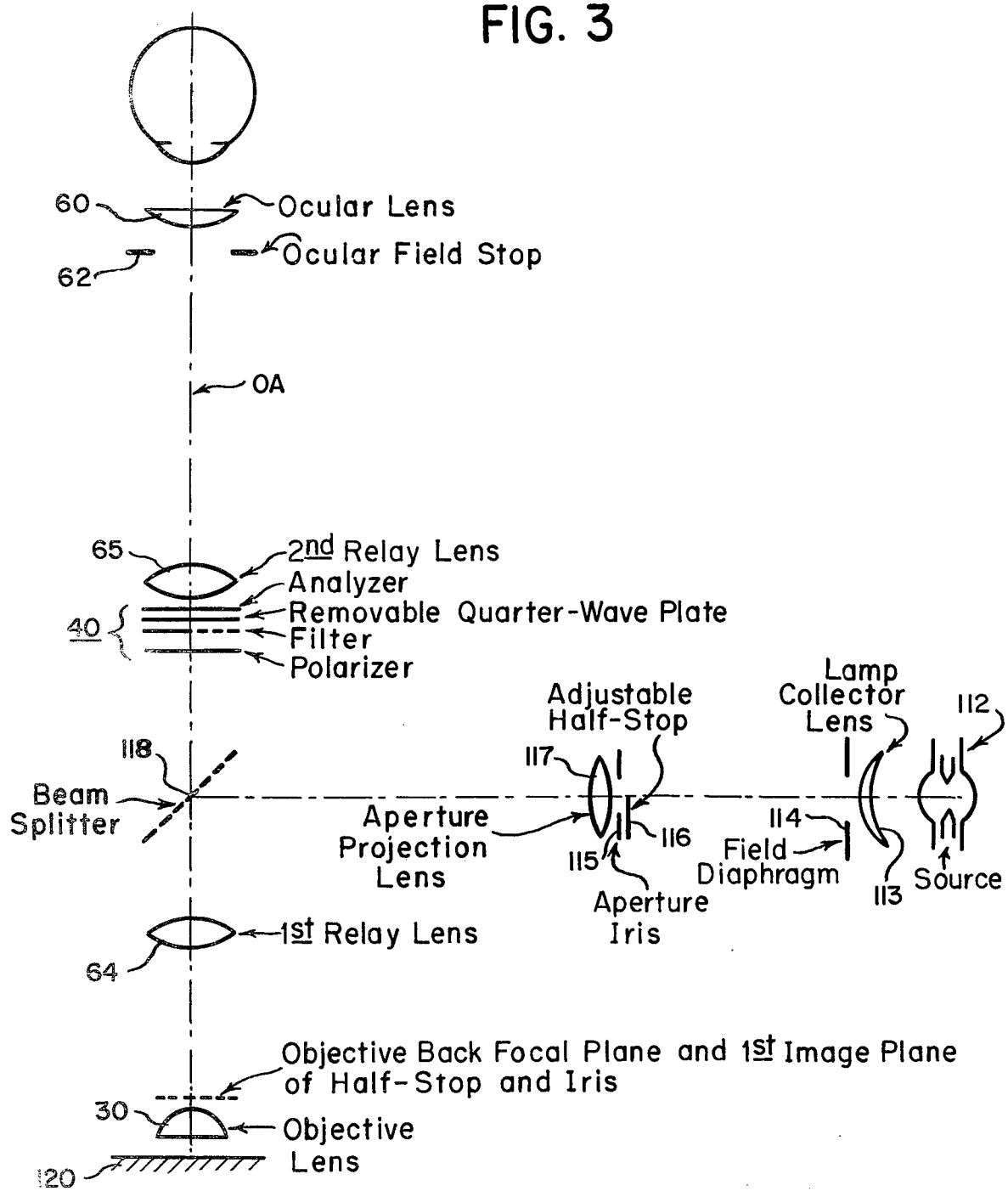

The practice of my invention is by no means limited to the optical designs shown in FIGS. 1 and 2. As shown in FIG. 3, my invention may also be practiced with reflecting microscopes in which the illuminating beam is directed through the objective lens, is reflected at the microscope stage and is directed by the objective lens to the eye of the viewer. In such a system the objective, first and second relay lenses, the attenuator, the ocular and the ocular field stop are essentially the same as those of the apparatus of FIG. 2 and accordingly have been numbered the same. The apparatus also includes a light source 112, a lamp collector lens 113, a field diaphragm 114, an iris 115, and adjustable stop 116, an aperture projection lens 117, a beam splitter 118, and a reflecting microscope stage 120 all aligned as shown on the optical axis OA. Except for the use of iris 115, stop 116 and attenuator 40 these elements are conventional and need not be discussed further. The operation of the iris, the stop and attenuator is the same as that of the corresponding elements in FIG. 1. Again, the iris and stop form an illuminating beam which illuminates the object with approximately a half-cone of rays. The undiffracted image of this light is formed at a Fourier transform plane on one region of the polarizing filter while diffracted light from only one sideband is incident on the other region. The relative attenuation between these two images is adjusted by rotation of the polarizer and analyzer with respect to the polarization sensitive filter.

Figure 4:
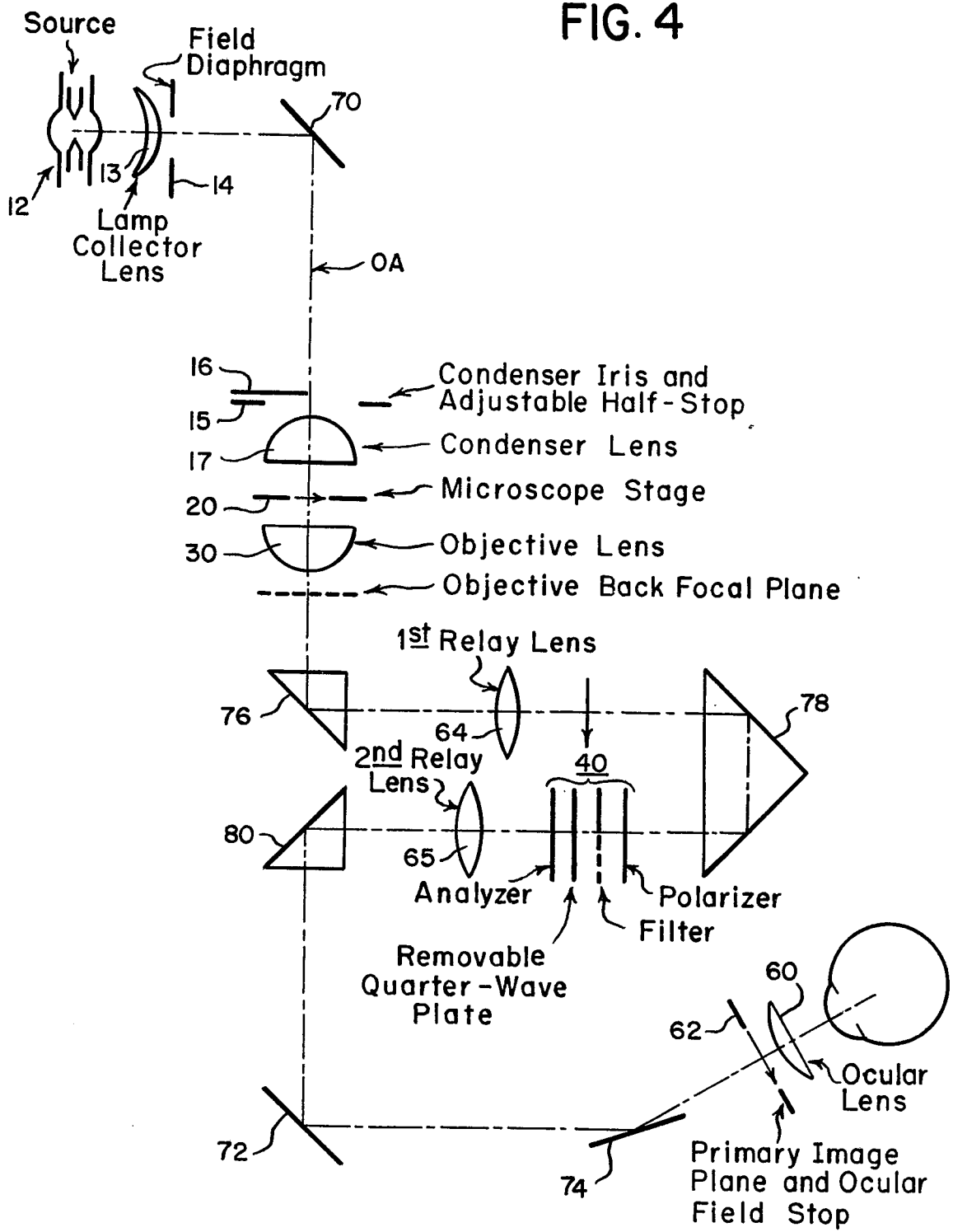
Figure 5:
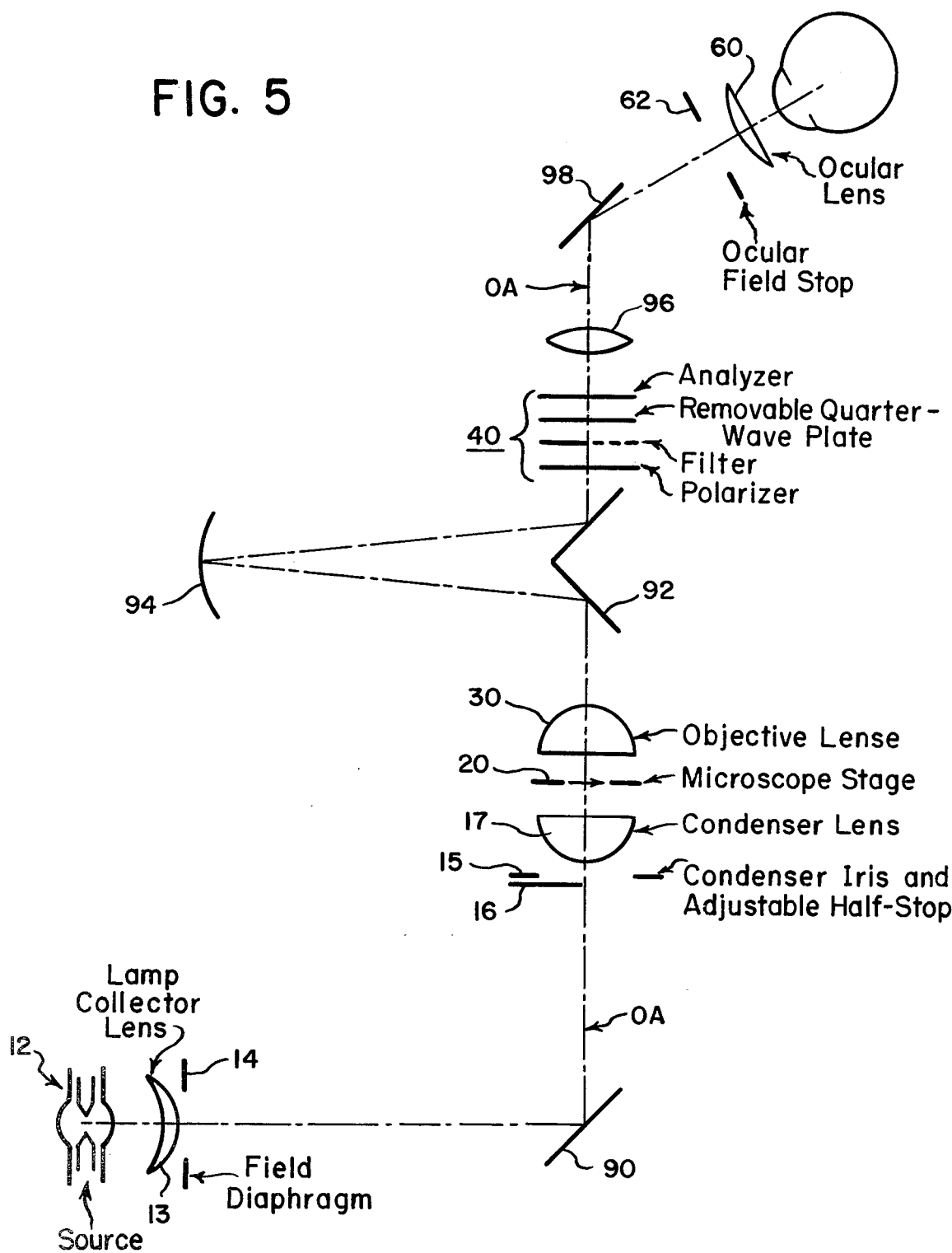

FIGS. 4 and 5 illustrate versions of the invention utilizing folded path relay systems. FIG. 4 illustrates the application of my invention to a Nikon interference phase attachment. For convenience, similar elements have the same numbers shown in FIG. 2. The apparatus differs from that shown in FIG. 2 by the use of mirrors 70, 72 and 74 and internally-reflecting prisms 76, 77 and 80 to fold the beam path.

The apparatus of FIG. 5 illustrates the application of the invention to a microscope using the spherical mirror relay of B. O. Payne. In addition to the elements of FIG. 1, which are numbered in the same fashion, this apparatus includes a mirror 90, a reflector 92, a spherical mirror 94, a lens 96 and a mirror 98 arranged as shown on optical axis OA.

From the foregoing discussion it will be apparent that my invention can readily be implemented in numerous microscopes used in the study of phase objects. In cases where the image of the back focal plane of the objective lens is accessible, attenuator 40 can readily be retrofitted. Ordinarily, the front focal plane of condenser lens 17 is accessible and iris 15 and adjustable stop 16 can readily be retrofitted at this position in the microscopes used in the art. Preferably, the precise diameter of iris 15 should be adjusted by telescopic inspection so that the curvature of the iris exactly matches the aperture of the objective. Stop 16 is then adjusted so as to confine the illuminating beam to one of the two regions 46, 48 of filter 44. As a result, this combination can match any objective whose aperture is less than or equal to the maximum aperture of the condenser; and, in particular, a 1.4 numerical aperture condenser can be used to illuminate any of the commercially available objective lenses.

In practicing my invention, I recommend that the optics used be selected on the basis of their image quality in bright field microscopy. Even though my system is responsive to birefringence in the specimen, the lenses are not located between crossed polarizers and therefore performance is not severely degraded by depolarization by the lenses. As a result, several recently designed plan-apochromats and long working distance objective lenses can be used in my invention even though they are difficult or impossible to use in differential interference contrast or polarization microscopy. Preferably, the condenser used in my invention should have achromatic-aplanatic correction and should match or exceed the numerical aperture of the objective. The stop that is used could be as simple as a slip of black paper but preferably it is a screw-adjustable blackened metal vane.

When practicing my invention for the purpose of examining transparent detail of birefringent objects, I recommend that a rotatable half-wave birefringence retardation plate be inserted between the objective and the polarizer. In this location the half-wave plate is used to post-select the effective plane of polarization of the light by which the object is viewed.

High intensity illumination is important for the practice of my invention as it is in other forms of phase microscopy. I have used a 100 watt super pressure mercury lamp (HBO 100 or equivalent). For most applications the lamp was used with two heat absorbing filters (Corning #4602) and a Baird Atomic high transmission type B2 interference filter for 546 nanometer mercury green light.

Each of polarizer 42, filter 44 and analyzer 52 is made from sheet polarizers (HN-22) supplied by Polaroid Corp. The polarizing material is mounted in Euperal green (Roboz Surgical Instrument Co., Washington, D.C.) between one millimeter thick antireflection coated, glass cover plates.

As will be apparent to those skilled in the art numerous modifications can be made to the invention described above and numerous approximations can be made to the particular configurations I have described. All such alternatives and approximations are fully intended to be within the scope of the claims set forth below.

For example, in addition to using visible light my invention may be practiced using any form of electromagnetic radiation that can be imaged. Conceivably it could also be practiced with other forms of radiation such as sound waves.

In cases where variable attenuation is not needed or where an inexpensive microscope is desired, a fixed amount of attenuation may be achieved simply by mounting a semicircular aperture in the front focal plane of the condenser and a suitable half plane attenuator in a rear focal plane of the objective lens in such a position that the "image" of the condenser aperture formed by the undiffracted illuminating beam is coincident with the attenuator.

As an alternative to the use of filter 44, a dichroic carrier suppression filter may be used. To form such a filter, a disc of stretched polyvinyl alcohol (PVA) sheeting is stained with iodine on only one half to form a variable absorption area for attenuation of the undiffracted light, leaving a transmitting region for the diffracted light incident on the other half. If made of a single sheet of PVA, the unstained half can act as a retardation plate where the effective retardation depends on the orientation of the analyzer. This system works, but more precise control of relative phase-shift between carrier and sideband light is obtained if the carrier suppression filter is made of two sheets of stretched PVA laminated together and oriented with their slow axes mutually crossed. The resultant disc is stained, as above, on only one half of one of the PVA sheets. The clear half, which transmits the diffracted light, is now effectively non-birefringent and produces no relative phase shift as compared to the undiffracted light transmitted by the attenuating region. Thus, when desired, the phase can be shifted by an auxiliary quarter-wave plate or variable compensator as before. An important virtue of the dichroic carrier suppression filter is the absence of a material edge at the dividing line between the carrier absorbing and sideband transmitting areas. Thus, it avoids the diffraction artifacts caused by transmitting light through two separate pieces of material which have been put together.

Figure 8:
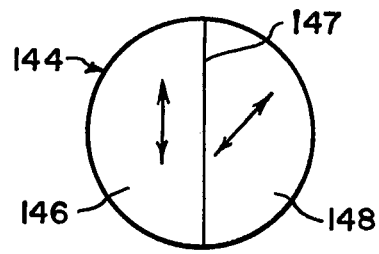
FIGS. 8 and 9 are schematic illustrations of alternative elements suitable for use in the attenuator of my invention.
Figure 9:
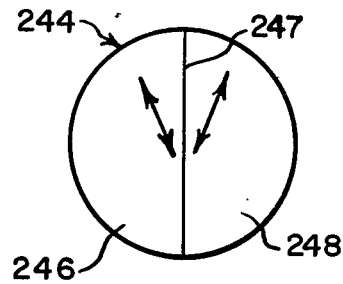

Still another alternative to the use of filter 44 is a birefringent filter, such as filters 144, 244 shown in FIGS. 8 and 9. In practicing my invention, either filter is mounted between polarizer 42 and analyzer 52 in place of filter 44. As in the case of polarizing filter 44, filters 144, 244 are divided into two halves 146, 148 and 246, 248, respectively, with borders 147 and 247 therebetween. As indicated by the arrows in FIGS. 8 and 9, the slow axes of the birefringent materials in these two regions are set at 45 degrees to each other. Illustratively, the thickness of filters 144, 244 is such as to create a quarter-wave phase difference, or an integral multiple thereof, between light polarized in the direction of the fast axis of the filter and that polarized in the direction of the slow axis upon propagation through the filter. The birefringent filters 144, 244 are mounted so that an image of the condenser aperture formed by the undiffracted light is incident on one region of the filter while diffracted light is incident on the other. As a result, the polarization in the light transmitted through one region will be different from that in the the light transmitted through the other region and will be a function of the angle between each of the slow axes and the direction of polarization in the polarizer. Consequently, the amount of attenuation in the light emerging from the analyzer will be different for the two beams and will vary with the angular position of the analyzer. Thus, adjustment of the positions of the analyzer and polarizer will alter the amplitude ratio between the undiffracted and diffracted light.

All of the polarization sensitive carrier suppression filters described above may be fabricated of inexpensive plastic elements mounted between simple plane glass covers. This contrasts favorably with the expensive crystalline quartz Wollaston prisms needed for differential interference microscopes.

With these birefringent carrier supression filters, and with the dichroic carrier suppression filter, as described above, the analyzer (or polarizer) may be fixed at an appropriate orientation and only the polarizer (or analyzer) need be rotated to vary the image contrast.

In some cases where a polarizing filter is used, simplicity of operation makes it preferable to couple the polarizer and analyzer together so that they are rotated in the same direction. In other instances it may be desirable to rotate them in opposite directions to produce a relative phase shift of 180 degrees between the diffracted and undiffracted images. If quarter-wave plate 50 is aligned with its fast axis parallel to the direction of polarization of the region on which the undiffracted light is incident, rotation of the polarizer and analyzer in the same direction away from extinction will produce a positive phase contrast image while rotation in the opposite direction produces a negative phase contrast image. Recall that a positive phase contrast image is by conventional usage one in which objects whose refractive index is higher than that of the immersing medium are imaged as regions darker than the background illumination. If the quarter-wave plate is aligned so that its fast axis is parallel to the direction of polarization on which the diffracted image is incident, the foregoing relationship is reversed.

For several reasons, I prefer to use an illuminating beam that is essentially a half-cone of radiation. In typical applications light transmission through the region of filter 44 on which the undiffracted beam is incident is attenuated drastically in order to match the intensity of the undiffracted beam with that of the diffracted light incident on the other region of filter 44. Such matching of intensities is desirable to produce images having the greatest contrast.

With condenser apertures that are smaller than a half-circle, the illuminating beam becomes more coherent ultimately approaching, a point source of light. This, however, makes the image more sensitive to the orientation of the object with respect to the illuminating beam. Smaller apertures also produce larger depths of focus which can degrade the quality of the image because of disturbances caused by objects out of the plane of focus.

Nevertheless, for some purposes, when an increased dependence of resolution on specimen orientation is not detrimental, image contrast may be further increased by adjusting stop 16 so that the condenser aperture is less than a half-circle. In this case the cross-section of the illuminating beam at the condenser entrance pupil and of the undiffracted beam at the objective rear focal plane is a segment of a circle whose curved boundary still is determined by the periphery of the objective aperture and whose chordal border is set by the new position of the stop. Compensatory adjustment of the position of filter 44 is desirable so that the "image" of edge 17 of the condenser aperture formed by the undiffracted part of the illuminating beam still coincides with border 47 between the two regions 46, 48 of filter 44.

In cases where the object is highly diffracting and reduction in image brightness can be tolerated, the edge of stop 16 could conceivably be located to define an aperture larger than a half circle. Again, the position of filter 44 should be adjusted so that the image of edge 17 of the condenser aperture formed by the undiffracted part of the illuminating beam coincides with border 47 between the two regions of filter 44. In either case, these adjustments require that filter 44 have a larger diameter than the largest objective aperture with which it is used.

Conceivably condenser apertures could be used having different shapes than a chord and the portion of the circumference of a circle that is intersected by the chord. The use of a chord, however, is preferred since its shape is not affected by magnification. Consequently, the "image" of edge 17 of stop 16 can be aligned with border 47 of the same polarization sensitive filter 44 even though objective lenses of different magnifications are used in the microscope. As indicated above, the use of an iris 15 having an adjustable diameter permits the user to adjust the iris diameter for objective lenses of different aperture. While such an iris is preferred, irises having fixed curvatures and conceivably other shapes could be used in the practice of my invention.

As is evident from a consideration of FIG. 1, the illuminating beam incident on the object consists largely of oblique illumination propagating at an angle to the optical axis although some radiation that propagates parallel to the optical axis is also incident on the object. The oblique illumination provides better response in the upper half of the spectrum of spatial frequencies resolvable by the apparatus of my invention.

Even in the case where the condenser aperture is larger than a semi-circle, the oblique illumination should come predominantly from one side of the optical axis if one wants to favor one sideband over the other. To favor the other sideband, it is a simple matter to rotate the object 180 degrees and illuminate it obliquely in the same fashion. As will be evident, in the case of a semi-circular aperture, and any smaller aperture, all oblique light incident on the object is from one side of the optical axis.

For convenience, the foregoing discussion of the invention has treated the beam of light from the condenser aperture as a single entity. A better appreciation of the spatial frequency filtering characteristics of the invention may be obtained by considering each point in the condenser aperture as an individual source of light. In the rear focal plane of the objective lens, each point source has an "image" formed by the undiffracted light, and, radiating outwards in all directions from each such "image" are sidebands of diffracted light. Along any line through an image are found a pair of sidebands—a right-hand and a left-hand sideband. In cases where border 47 of filter 44 is positioned so that point sources of light along edge 17 of the condenser aperture are "imaged" near border 47, substantially all of one of a pair of sidebands will fall in one region 46 or 48 of filter 44 and substantially all of the other sideband will fall in the other region. For point sources of light within the conderser aperture, the undiffracted light will fall within one of the regions 46, 48 and only a portion of one sideband will fall in the region on which the undiffracted light is not incident. The remainder of that sideband plus all of the other sideband up to the spatial frequency cutoff of the objective lens will fall on the same region on which the undiffracted light is incident.

Ordinarily, attenuator 40 will be adjusted to produce substantial attenuation of all light incident on that region 46 or 48 of filter 44 on which the undiffracted light is incident. As a result, the undiffracted light together with all diffracted light incident on the same region of filter 44 will be greatly attenuated. Since the intensity of diffracted light is normally much less than that of the undiffracted light, attenuation of the light incident on the region on which the undiffracted light is incident will substantially eliminate the effects of any diffracted light incident on this same region. As a result, in typical operation of my invention, the image formed is essentially comprised of the undiffracted light, which passes through one region 46 or 48 of filter 44, and the light from a portion of only one sideband which passes through the other region. In the case where the border 47 of filter 44 is positioned near the optical axis OA, the portion of the sideband that is transmitted through said other region ranges from about 50% to about 100% of that available within the spatial frequency cutoff of the objecting lens. In all cases a substantial amount of sideband light must be transmitted to form a bright image with good contrast.

As indicated above, border 47 of filter 44 is normally positioned so that point sources of light along edge 17 of the condenser aperture are "imaged" near the border. The precise position of border 47 with respect to the images of the point sources along edge 17 is a matter of choice depending on how careful one wants to be to ensure that all the undiffracted light falls on the same region of filter 44.

FIGS. 10 and 11 depict the performance of a microscope, constructed and operated in accordance with my invention, in terms of relative sideband capture versus spatial frequency. The performance depicted by curve 1 of FIG. 10 is that of a conventional microscope having unmodified circular apertures and a condenser lens and an objective lens which have a numerical aperture of 1.32. Curve 2 depicts the performance of a conventional phase contrast microscope having an objective lens with a numerical aperture of 1.32, a condenser annulus with a numerical aperture from 0.52 to 0.74 and a phase ring with a numerical aperture from 0.49 to 0.77. Curve 3 depicts the performance of a microscope made according to my invention using a condenser lens and an objective lens which have a numerical aperture of 1.32, a condenser aperture which is approximately a semi-circle and a filter in the rear focal plane which is aligned with the image of said aperture formed by the undiffracted light.

As shown in FIG. 10, this microscope acts as a high pass spatial frequency filter which provides improved high frequency image contrast and higher resolution (i.e., edge enhancement) relative to conventional phase contrast microscopes. FIG. 11 shows the change in sideband capture with object orientation. Note that the highest spatial frequencies are least dependent on orientation.

FIGS. 10 and 11 show on the ordinate, the ratio of the area in common between the exit pupil of the objective, assuming total suppression of the sideband in the area conjugate with the carrier, and the image of the entrance pupil of the condenser translated in the specified azimuth direction by a distance proportional to the sine of the diffraction angle for the spatial frequency on the abscissa, as compared to the total area of the condenser pupil. This ratio defines the maximum capture ratio for sideband energy from a spatial frequency arrayed in the azimuthal direction, and hence the upper limit to the modulation transfer for that frequency and direction. For single sideband apertures only one sideband is captured so that at maximum only half of the total diffracted energy is captured. However, with the freedom to adjust the carrier amplitude before it is recombined with the sideband(s) at the image plane, the relative sideband capture, as a function of frequency, is the limiting factor to potential modulation transfer.

Azimuth angle is defined as the angle, taken perpendicular to the optical axis, between the normal to the bars of a test grating and the division line in the single sideband filter.

As will be apparent to those skilled in the art numerous other alternatives and modifications may readily be made in the practice of my invention.

What is claimed is:

1. Apparatus for forming an image of an object by irradiating said object to form undiffracted radiation and diffracted radiation comprising:
   a lens for forming an image of the object;
   means for obliquely irradiating the object with radiation incident on the object predominantly from one side so that at least a substantial portion of the undiffracted radiation is directed through a first portion of a rear focal plane of the lens and at least a substantial portion of only one sideband of the diffracted radiation is directed through the remainder of the rear focal plane of the lens, said means comprising:
      means for forming a beam of radiation which is diverging at the front focal plane of a condenser lens and is not a point source at said plane and
      a circular aperture and a substantially opaque object located substantially at said front focal plane and defining a substantially semi-circular aperture; and
   in the rear focal plane of said lens, or an image thereof, means for attenuating at least one of said sideband and the undiffracted radiation, said means dividing said rear focal plane, or image thereof, into only two regions through which image-forming radiation is transmitted, the image formed by the undiffracted portion of the beam being incident on substantially all of the first of said regions and only on said first region and the single sideband of the diffracted portion being incident on the second region.

2. The apparatus of claim 1 wherein the attenuating means further comprises:
   first means for linearly polarizing the radiation which forms said image in the rear Fourier transform plane of said lens;
   second means for linearly polarizing radiation, said second means being aligned with said first means so that radiation incident on said first means is incident on said second means, said second means being capable of being set so that its direction of polarization is not parallel to that of the polarized radiation incident on it.

3. The apparatus of claim 1 wherein the attenuating means comprises:
   first means for linearly polarizing both the undiffracted radiation and said sideband of diffracted radiation;

a linearly polarizing filter which has a direction of polarization in a first region where the undiffracted radiation is incident that is different from the direction of polarization in a second region where only said sideband of diffracted radiation is incident; and an analyzer in line with the direction of propagation of radiation from the polarizing filter.

4. The apparatus of claim 3 wherein the directions of polarization in said two regions of the polarizing filter are at right angles to one another.

5. The apparatus of claim 4 further comprising a phase retardation plate located between said polarizing filter and said analyzer, said retardation plate being oriented such that its fast axis is parallel to the direction of polarization in one of said regions of said polarizing filter.

6. The apparatus of claim 5 wherein the phase retardation plate is a quarter-wave retardation plate.

7. The apparatus of claim 3 further comprising means for rotating said polarizer and said analyzer with respect to said polarizing filter to alter the attenuation of the radiation which passes through said first region of the polarizing filter relative to the attenuation of the radiation which passes through said second region of the polarizing filter.

8. The apparatus of claim 1 wherein the attenuating means comprises:

first means for linearly polarizing both the undiffracted radiation and said sideband of diffracted radiation;

a birefringent filter which has a slow axis in a first region where the undiffracted radiation is incident that is oriented in a direction that is different from that of a slow axis in a second region where only said sideband of diffracted radiation is incident; and an analyzer in line with the direction of propagation of radiation from the birefringent filter.

9. The apparatus of claim 8 wherein the directions of said slow axes in said two regions of the birefringent filter are at approximately 45 degrees to one another.

10. The apparatus of claim 8 further comprising means for rotating said analyzer with respect to said birefringent filter to alter the phase of the radiation which passes through said first region of the birefringent filter relative to the phase of the radiation which passes through said second region of the birefringent filter.

11. The apparatus of claim 8 further comprising means for rotating said polarizer with respect to said birefringent filter to alter the attenuation of the radiation which passes through said first region of the birefringent filter relative to the attenuation of the radiation which passes through said second region in the birefringent filter.

12. The apparatus of claim 1 wherein the attenuating means comprises:

first means for linearly polarizing both the undiffracted radiation and said sideband of diffracted radiation;

a sheet of stretched polyvinyl alcohol which is stained in a first region where the undiffracted radiation is incident and is not stained in a second region on which only said sideband of diffracted radiation is incident; and an analyzer in line with the direction of propagation of radiation from said sheet of stretched polyvinyl alcohol.

13. The apparatus of claim 12 further comprising means for rotating at least one of said polarizer and analyzer with respect to said sheet of polyvinyl alcohol.

14. The apparatus of claim 1 wherein the attenuating means comprises:

first means for linearly polarizing both the undiffracted radiation and said sideband of diffracted radiation;

two sheets of stretched polyvinyl alcohol laminated together and oriented with their slow axes mutually crossed, at least one of said sheets being stained in a first region where the undiffracted radiation is incident and neither sheet being stained in a second region where only said sideband of diffracted radiation is incident;

an analyzer in line with the direction of propagation of radiation from the two sheets of stretched polyvinyl alcohol.

15. The apparatus of claim 14 further comprising means for rotating at least one of said polarizer and analyzer with respect to said sheets of polyvinyl alcohol.

16. The apparatus of clam 1 wherein the beam forming means includes a source of electromagnetic radiation.

17. The apparatus of claim 1 wherein the beam forming means includes a light source.

18. Apparatus for forming an image of an object in which the object is irradiated with a beam of radiation to produce an undiffracted portion and a diffracted portion of said beam comprising:

a lens for forming an image of the object;

a substantially semi-circular illuminating aperture for directing at the object said beam of radiation to form in the rear focal plane of said lens, or an image thereof, both an image formed by the undiffracted portion of the beam and a single sideband of the diffracted portion of the beam, a substantial portion of said single sideband being separate from said image formed by the undiffracted portion, said single sideband and said image formed by the undiffracted portion being combined by said lens to form the image of said object; and means for attenuating said image formed by the undiffracted portion of the beam of radiation, said means being located in the rear focal plane of said lens, or an image thereof, said means dividing said rear focal plane, or image thereof, into only two regions through which image-forming radiation is transmitted, the image formed by the undiffracted portion of the beam being incident on substantially all of the first of said regions and only on said first region and the single sideband of the diffracted portion being incident on the second region.

19. The apparatus of claim 18 wherein the attenuating means comprises:

first means for linearly polarizing both the radiation which forms said image in the rear Fourier transform plane of said lens and said single sideband radiation which is diffracted by said object;

a linearly polarizing filter which has a direction of polarization in a first region where the image formed by the undiffracted radiation is incident that is different from the direction of polarization in a second region where only the diffracted radiation is incident; and an analyzer in line with the direction of propagation of radiation from the polarizing filter.

20. The apparatus of claim 18 wherein the attenuating means comprises:
   first means for linearly polarizing both the radiation which forms said image in the rear Fourier transform plane of said lens and said single sideband radiation which is diffracted by said object;
   a birefringent filter which has a slow axis in a first region where the image formed by the undiffracted radiation is incident that is oriented in a direction that is different from that of a slow axis in a second region where only the diffracted radiation is incident; and
   an analyzer in line with the direction of propagation of radiation from the birefringent filter.

21. The apparatus of claim 18 wherein the attenuating means comprises:
   first means for linearly polarizing both the radiation which forms said image in the rear Fourier transform plane of said lens and said single sideband radiation which is diffracted by said object;
   a sheet of stretched polyvinyl alcohol which is stained in a first region where the image formed by the undiffracted radiation is incident and is not stained in a second region on which only the diffracted radiation is incident; and
   an analyzer in line with the direction of propagation of radiation from said sheet of stretched polyvinyl alcohol.

22. Apparatus for forming an image of an object comprising:
   means for mounting a source of electromagnetic radiation for irradiating the object;
   a condenser lens;
   a substantially semi-circular condenser aperture;
   an objective lens; and
   in a rear focal plane of said objective lens, or an image thereof, attenuating means dividing said rear focal plane, or an image thereof, into only two regions through which image-forming radiation is transmitted, an image of said condenser aperture formed by an undiffracted portion of the radiation incident of the object being substantially coincident with one of said regions and radiation diffracted by the object being incident on the other region.

23. The apparatus of claim 22 wherein said condenser aperture is located in the front focal plane of said condenser lens.

24. The apparatus of claim 22 wherein a single lens performs the functions of both the condenser lens and the objective lens, said apparatus further comprising:
   means for forming an image of said condenser aperture at a front focal plane of said single lens; and
   means for reflecting radiation from said single lens back to said single lens.

25. The apparatus of claim 22 further comprising means for forming an image of the rear focal plane of said objective lens, said attenuating means being located at said image.

26. The apparatus of claim 25 further comprising folded path optics between said objective lens and said attenuating means.

27. The apparatus of claim 22 further comprising an ocular.

28. The apparatus of claim 22 wherein the attenuating means comprises:
   first means for linearly polarizing both the radiation which forms said image of the condenser aperture in the rear Fourier transform plane of said lens and said electromagnetic radiation which is diffracted by said object;
   a linearly polarizing filter which has a direction of polarization in a first region where the image of the condenser aperture formed by the undiffracted radiation is incident that is different from the direction of polarization in a second region where only the diffracted radiation is incident; and
   an analyzer in line with the direction of propagation of radiation from the polarizing filter.

29. The apparatus of claim 22 wherein the attenuating means comprises:
   first means for linearly polarizing both the radiation which forms said image of the condenser aperture in the rear Fourier transform plane of said lens and said radiation which is diffracted by said object;
   a birefringent filter which has a slow axis in a first region where the image of the condenser aperture formed by the undiffracted radiation is incident that is oriented in a direction that is different from that of a slow axis in a second region where only the diffracted radiation is incident; and
   an analyzer in line with the direction of propagation of radiation from the birefringent filter.

30. The apparatus of claim 22 wherein the attenuating means comprises:
   first means for linearly polarizing both the radiation which forms said image of the condenser aperture in the rear Fourier transform plane of said lens and said radiation which is diffracted by said object;
   a sheet of stretched polyvinyl alcohol which is stained in a first region where the image of the condenser aperture formed by the undiffracted radiation is incident and is not stained in a second region on which only the diffracted radiation is incident; and
   an analyzer in line with the direction of propagation of radiation from said sheet of stretch polyvinyl alcohol.

31. The apparatus of claim 22 wherein the condenser aperture is defined by a chordal element which intersects a portion of the circumference of a circle.

32. The apparatus of claim 31 further comprising means for varying the size of the condenser aperture.

33. Apparatus for forming an image of an object by irradiating said object to form undiffracted radiation and diffracted radiation comprising:
   a lens for forming an image of the object;
   means for irradiating the object with approximately a half-cone of radiation to direct at least a substantial portion of only one sideband of diffracted radiation through a first portion of a rear focal plane of the lens and to direct at least a substantial portion of the undiffracted radiation through the remainder of the rear focal plane of the lens; and
   in the rear focal plane of said lens, or an image thereof, means for attenuating one of said sideband of diffracted radiation and said undiffracted radiation relative to the other, said attenuating means dividing said rear focal plane, or image thereof, into first and second radiation-transmissive regions, said second region being substantially coincident with said remainder of the rear focal plane, or an image thereof.

34. The apparatus of claim 33 wherein the means for irradiating the phase object comprises:

means for forming a beam of radiation which is diverging at the front focal plane of a condenser lens and is not a point source at said plane; and means for blocking the radiation in at least a portion of said front focal plane.

35. The apparatus of claim 33 wherein the means for irradiating the object comprises:

means for forming a beam of radiation which is diverging at the front focal plane of a condenser lens and is not a point source at said plane; and a circular aperture and an opaque object located substantially at said front focal plane and defining a substantially semi-circular aperture.

36. The apparatus of claim 33 wherein the attenuating means comprises:

first means for linearly polarizing both said diffracted radiation and said undiffracted radiation;

a linearly polarizing filter which has a direction of polarization in said first region that is different from the direction of polarization in said second region; and an analyzer in line with the direction of propagation of radiation from the polarizing filter.

37. The apparatus of claim 33 wherein the attenuating means comprises:

first means for linearly polarizing both said diffracted radiation and said undiffracted radiation;

a birefringent filter which has slow axis in said first region that is oriented in a direction that is different from that of a slow axis in said second region; and an analyzer in line with the direction of propagation of radiation from the birefringent filter.

38. The apparatus of claim 33 wherein the attenuating means comprises:

first means for linearly polarizing both said diffracted radiation and said undiffracted radiation;

a sheet of stretched polyvinyl alcohol which is stained in said first region and is not stained in said second region; and an analyzer in line with the direction of propagation of radiation from said sheet of stretched polyvinyl alcohol.

39. In an apparatus for forming an image of object, a method for forming such image comprising the steps of:

forming a beam of radiation which is diverging at the front focal plane of a condenser lens and is not a point source at said plane;

blocking the radiation in substantially one half of said front focal plane by passing it through a substantially semi-circular aperture;

obliquely irradiating the object with radiation that has passed through said aperture to form undiffracted radiation and diffracted radiation;

forming an image of the object with a lens; and directing said undiffracted radiation and only a single sideband of said diffracted radiation through an attenuating means in a rear Fourier transform plane of said lens, said undiffracted radiation being directed through a first region of said attenuating means and said diffracted radiation being directed through a second region of said attenuating means, the amount of attenuation in said first region being different from the amount of attenuation, if any, in said second region.

40. The method of claim 39 wherein the step of directing radiation through an attenuating means further comprises the steps of:

linearly polarizing the radiation which forms said image in the rear Fourier transform plane of said lens;

passing said linearly polarized radiation through a linearly polarizing filter which may be set so that its direction of polarization is not parallel to that of the polarized radiation incident on it.

41. The method of claim 39 wherein the step of directing radiation through an attenuating means comprises the steps of:

linearly polarizing both said undiffracted radiation and said diffracted radiation;

passing said linearly polarized radiation through a linearly polarizing filter which has a direction of polarization in a first region where said undiffracted radiation is incident that is different from the direction of polarization in a second region where only the diffracted radiation is incident; and passing said radiation from the polarizing filter through an analyzer.

42. The method of claim 41 wherein the directions of polarization in said two regions of the polarizing filter are at right angles to one another.

43. The method of claim 42 further comprising the step of directing the radiation from said polarizing filter through a phase retardation plate before said radiation is incident on said analyzer, said retardation plate being oriented such that its fast axis is parallel to the direction of polarization in one of said regions of said polarizing filter.

44. The method of claim 43 wherein the phase retardation plate is a quarter-wave retardation plate.

45. The method of claim 41 further comprising the step of rotating said polarizer and said analyzer with respect to said polarizing filter to alter the attenuation of the radiation which passes through said first region of the polarizing filter relative to the attenuation of the radiation which passes through said second region of the polarizing filter.

46. The method of claim 45 wherein the direction of polarization of the analyzer is substantially parallel to that of the polarizer.

47. The method of claim 39 wherein the step of blocking said radiation comprises the step of passing the beam of radiation through a semi-circular aperture, the diameter of said aperture intersecting the optical axis of said apparatus.

48. The method of claim 39 wherein the step of directing radiation through an attenuating means comprises the steps of:

linearly polarizing both said undiffracted radiation and said diffracted radiation;

passing said linearly polarized radiation through a birefringent filter which has a slow axis in a first region where said undiffracted radiation is incident oriented in a direction that is different from that of the slow axis in a second region where only the diffracted radiation is incident; and passing said radiation from the birefringent filter through an analyzer.

49. The method of claim 48 wherein the directions of said slow axis in said two regions of the birefringent filter are at approximately 45 degrees to one another.

50. The method of claim 48 further comprising the step of rotating said analyzer with respect to said birefringent filter to alter the phase of the radiation which passes through said first region of the birefringent filter relative to the phase of the radiation which passes through said second region of the birefringent filter.

51. The method of claim 48 further comprising the step of rotating said polarizer with respect to said birefringent filter to alter the attenuation of the radiation which passes through said first region of the polarizing filter relative to the attenuation of the radiation which passes through said second.

52. A method for forming an image of an object in which the object is irradiated with a beam of radiation to produce an undiffracted portion and a diffracted portion of said beam, said method comprising the steps of:

forming said beam of radiation into approximately a half-cone of radiation and directing it at the object to form in the rear focal plane of a lens, or an image thereof, both an image formed by the undiffracted portion of the beam and a single sideband of the diffracted portion of the beam, a substantial portion of said single sideband being separate from said image formed by the undiffracted portion, said single sideband and said image formed by the undiffracted portion being combined by said lens to form the image of said object; and at said rear focal plane, or an image thereof, dividing said plane with an attenuating means into only two radiation-transmissive regions and directing said single sideband through a first region of said attenuating means and directing said image formed by the undiffracted portion of the beam through a second region of said attenuating means, said image being substantially coincident with said second region, whereby one of said single sideband and said image formed by the undiffracted portion of said beam is attenuated relative to the other.

53. The method of claim 52 wherein the step of directing a beam of radiation at the object comprises the steps of:

forming a beam of radiation which is diverging at the front focal plane of a condenser lens and is not a point source at said plane; and blocking the radiation substantially one half of said focal plane by passing it through a substantially semi-circular aperture.

54. The method of claim 53 wherein the step of blocking said radiation comprises the step of passing the beam of radiation through a semicircular aperture, the diameter of said aperture intercepting the optical axis of said apparatus.

55. A method for forming an image of an object in which the object is irradiated with a beam of electromagentic radiation to produce an undiffracted portion and a diffracted portion of said beam, said method comprising the steps of:

forming said beam of electromagnetic radiation into approximately a half cone of radiation converging on said object which is located near the narrow portion of said half cone;

forming in the rear focal plane of a lens, or an image thereof, both the undiffracted portion of the beam of electromagnetic radiation and a single sideband of the diffracted portion of said beam, a substantial portion of said single sideband being separate from said image formed by the undiffracted portion, said single sideband and said undiffracted portion being combined by said lens to form the image of said object; and at said rear focal plane, or an image thereof, directing said single sideband through a first region of an attenuating means and directing said undiffracted portion through a second region of said attenuating means, whereby one of said single sideband and said undiffracted portion is attenuated relative to the other.

56. The method of claim 55 wherein the undiffracted portion of the beam of electromagnetic radiation is substantially coincident with said second region of said attenuating means.

* * * * *